United States Patent Office 3,286,512
Patented Nov. 22, 1966

3,286,512
APPARATUS FOR TESTING LIP SEALS
Ernest T. Jagger, Geoffrey W. Halliday, and Peter W. Pattison, Newcastle upon Tyne, England, assignors to George Angus & Company Limited, Newcastle upon Tyne, England, a British company
Filed Nov. 16, 1964, Ser. No. 411,284
Claims priority, application Great Britain, Nov. 21, 1963, 45,999/63
5 Claims. (Cl. 73—88)

This invention relates to apparatus for testing lip seals, i.e. sealing rings of rubber or like resilient material and which have a flexible peripheral portion, or "lip," for sealing against a relatively movable cylindrical surface.

Such lip seals may be of the external type in which the lip is on the outer periphery for sealing radially outwardly against a surrounding cylindrical surface, such as a wall of a housing or of a cylindrical recess, or may be of the internal type in which the lip is on the inner periphery sealing radially inwardly against a shaft or stub.

The present invention is concerned with apparatus for obtaining a direct measure of the radial loading, referred to herein as the lip loading, upon the lip of a lip seal when fitted in contact with a cylindrical surface of the diameter for which the seal is intended.

In a known apparatus for determining the lip loading of an internal shaft seal, the seal to be tested is fitted upon a diametrally split spigot of appropriate nominal diameter. The two parts of the spigot can be thrust apart, perpendicularly to the plane of the split, by the force of a helical compression spring which is manually adjustable by a screw mechanism or other device. The spring force is adjusted until the two parts of the spigot are separated and their overall diameter, perpendicularly to the split, corresponds to the nominal shaft diameter for a seal to be tested. If a seal is then fitted on to the split spigot, the force exerted upon the two parts of the spigot by the lip of the seal becomes imposed upon the spring.

The consequent slight compression of the spring, which provides a measure of the lip loading of the seal, is then read. To facilitate use of the apparatus, the compression of the spring is generally read against a scale directly calibrated in terms of lip loading.

In this known form of apparatus, frictional effects are high and are such as to affect the accuracy of the results obtained. Moreover, manual adjustment of the compression of the spring is slow and the time involved in obtaining the lip loading of a seal is relatively long, compared with the rate at which seals are manufactured.

It is an object of the present invention to provide apparatus for measuring the lip loading of a lip seal quickly, to a high degree of accuracy, and which is suitable for the rapid testing of large batches of seals produced on an industrial scale.

The invention is applied to lip seal testing apparatus comprising a diametrally split cylindrical surface member composed of two parts mounted for relative movement perpendicularly to the diametral split between them, the cylindrical surface of the split member corresponding in diameter to a cylindrical surface to be sealed by the lip of a seal to be tested and actuating means being provided for both effecting and indicating the relative movement of the split member parts. According to the invention, the actuating means includes a pneumatic load cell having a thrust member, means for supplying air under controlled pressure to the cell to move the thrust member, mechanical coupling means between the thrust member and a part of the split member for transmitting movement of one to the other and a pressure gauge connected to the cell to respond to change of pressure consequent on movement of the thrust member.

In such apparatus, the pneumatic load cell provides an easily and quickly operable means for imparting to the split member a measurable force in opposition to the load of the lip of a seal thereon and by which the lip loading can be measured. The gauge which indicates the pressure in the pneumatic cell can be calibrated in a lip loading scale for direct reading as seals are tested.

The apparatus can be made suitable for testing internal or external seals, according to whether the cylindrical surface of the split member is an external or internal cylindrical surface.

In a preferred construction of apparatus for testing internal lip seals, the cylindrical surface member is a split stub shaft, the thrust member of the pneumatic load cell is a plunger with a stem acting as a piston in a cylinder block constituting the cell body and the coupling means between the plunger and a movable part of the stub-shaft is a bell crank lever An example of such a preferred apparatus in accordance with the invention for testing internal lip seals is illustrated on the accompanying drawing, in which.

Figure 1:
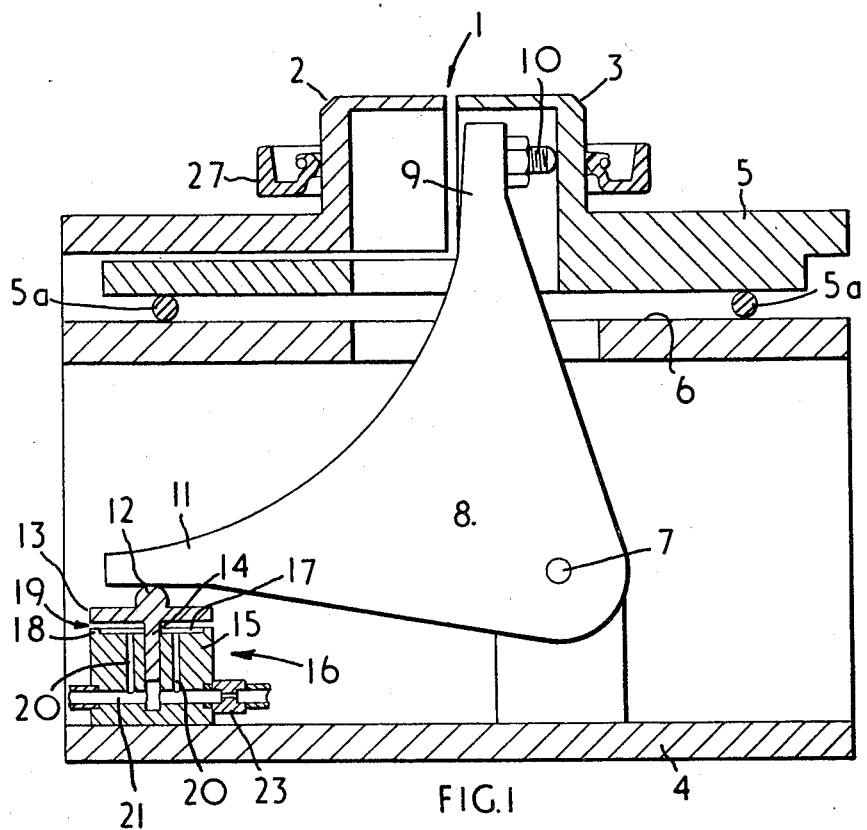
FIG. 1 shows the apparatus in axial section.

In the apparatus of FIG. 1, a hollow stub-shaft 1 diametrally split into halves 2 and 3 is mounted upon a frame 4 with the plane of the split arranged vertically. One half 2 of the stub-shaft is secured fast to the frame 4 while the other half 3 is carried by a carriage 5 which is moveable, on anti-friction bearings 5a, along a horizontal guideway 6 towards and away from the fixed half 2 and perpendicularly to the plane of the split.

Pivoted in the frame, about a horizontal-axis pivot 7, is a bell crank lever 8 having one arm 9 extending upwards into the interior of the sub-shaft 1 and there carrying an adjustable abutment member 10 to bear against the inside of the moveable half 3.

The other arm 11 of the bell crank lever 8 bears against a central boss 12 on the upper surface of a mushroom-shaped plunger head 13. The stem 14 of the plunger slides as a piston in the cylinder bore of the body 15 of a pneumatic load cell 16 so that vertical movement of the plunger causes the plunger head 13 to move towards or away from a cavity 17 formed, as a shallow annular recess within a peripheral flange 18, in the top of the body 15 beneath the plunger head 13.

The flange 18 defines, between itself and the undersurface of the plunger head 13, a circumferential gap 19 through which can escape air delivered under pressure to the cavity 17 through two axial passages 20 from a cross duct 21 in the body 15 of the load cell.

Figure 2:
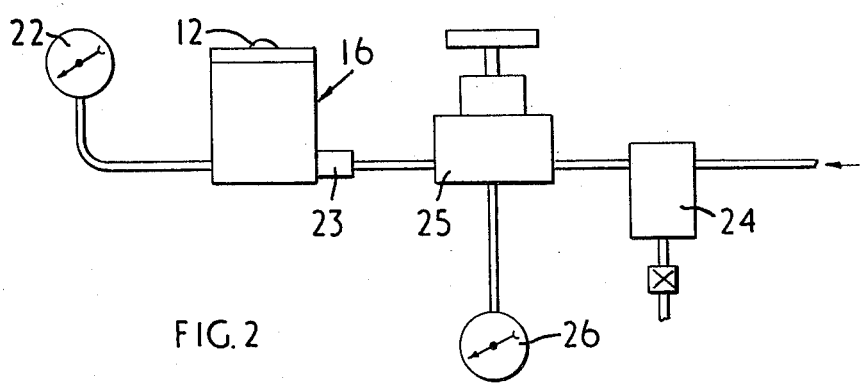
FIG. 2 is a diagram of a pneumatic circuit incorporating a load cell of the apparatus of FIG. 1.

The duct 21 is connected at one end to a pressure gauge 22 (FIG. 2) and at the other end has an air flow restrictor 23 through which air under pressure is delivered. As shown by FIG. 2, the air supply passes through a filter 24 and a pressure-reducing valve 25 set to a given pressure by a regulating gauge 26.

According to the pressure at which air is supplied to the load cell 16, the plunger head 13 will stabilise at a height at which the gap 19 bleeds air at a rate which balances the supply through the restrictor 23. This limits the volume of air flow to a very small amount and also serves to stabilise the operation of the cell and eliminate hunting.

The thrust of the plunger head 13 is transmitted through the bell-crank 8, to the movable half 3 of the stub-shaft which, by the consequent slight separation of its halves, assumes an overall diametral dimension, perpendicular to the split, which is the nominal diameter of a shaft for which a seal to be tested is intended. Suitable pairs of stub-shaft halves 2 and 3 are provided for each size of seal.

If a seal 27 is now fitted on to the split stub shaft, the constricting force exerted on the two halves 2 and 3 by the seal lip slightly moves the movable half 3 towards the other half 2 and rocks the bell crank lever 8 to depress the plunger head 13 and thus narrow the gap 19. This restricts the escape of air and causes an increase in pressure which is indicated by the gauge 22. The gauge is calibrated with a scale of lip loading, in any desired units, and thus provides a direct reading of lip loading.

It should be appreciated that although the displacements of the load cell plunger are a function of the applied pressures, in practice the displacements are so small as to be indetectable by a .0001 inch clock gauge.

In use, the above described apparatus is found to be more accurate than the mechanical apparatus generally used for measuring the lip loading of shaft seals, and is such as to permit a more rapid measurement of the lip loading of one or more shaft seals.

The time taken to measure the lip loading varies with the value of the lip loading exerted by the seal but on average is about 10 seconds per seal. Accordingly, large batches of seals can be tested in a relatively short time.

What is claimed is:

1. Lip seal testing apparatus comprising a diametrally split cylindrical surface member composed of two parts mounted for relative movement perpendicularly to the diametral split between them, the cylindrical surface of the split member corresponding in diameter to a cylindrical surface to be sealed by the lip of a seal to be tested, and actuating means for both effecting and indicating the relative movement of the split member parts; in which said actuating means includes a pneumatic load cell, a thrust member of said cell, means for supplying air under controlled pressure to said cell to move said thrust member, mechanical coupling means between said thrust member and a part of said split member for transmitting movement of one to the other and a pressure gauge connected to said cell to respond to change of pressure consequent on movement of said thrust member.

2. Apparatus according to claim 1, in which said cell comprises a cylinder block and said thrust member is a plunger with a stem inserted as a piston in said cylinder block and a head which defines with said block a variable air bleed.

3. Apparatus according to claim 2, in which said mechanical coupling means comprises a bell crank lever having one arm in engagement with said plunger head and the other arm in engagement with one part of said split member, said part being movably mounted.

4. Apparatus according to claim 3, in which said split member is a split stub shaft for an internal lip seal.

5. Apparatus according to claim 1, in which said pneumatic load cell has variable air bleed means responsive to and stabilising the position of said thrust member at a given applied air pressure.

References Cited by the Examiner

UNITED STATES PATENTS 2,448,735  9/1948  Pigott et al. _____ 73—120
3,228,237  1/1966  Newton _____ 73—88

FOREIGN PATENTS 929,076  6/1947  France.

RICHARD C. QUEISSER, *Primary Examiner.*